No. 787,883. PATENTED APR. 18, 1905.
G. KAPHINGST & P. SEITH.
PAPER HOLDER.
APPLICATION FILED JUNE 6, 1904.
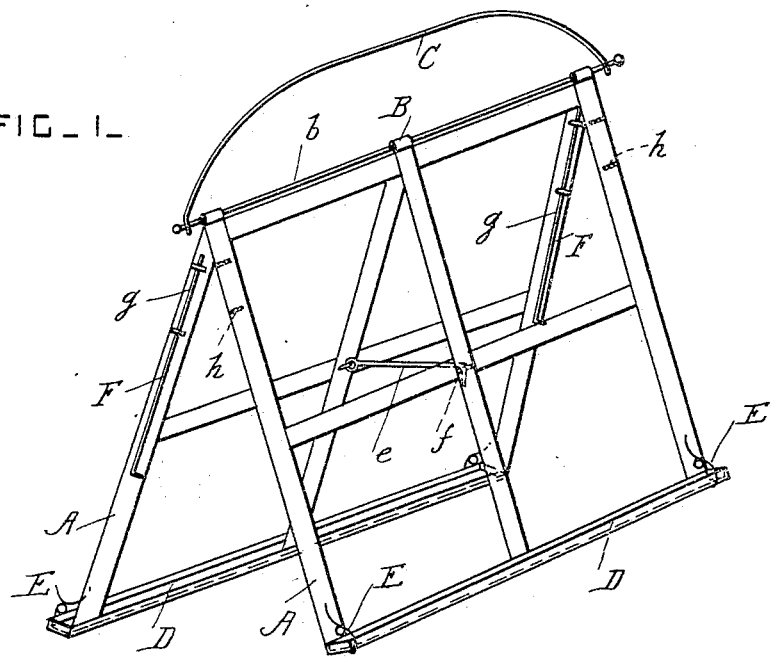
FIG_1_
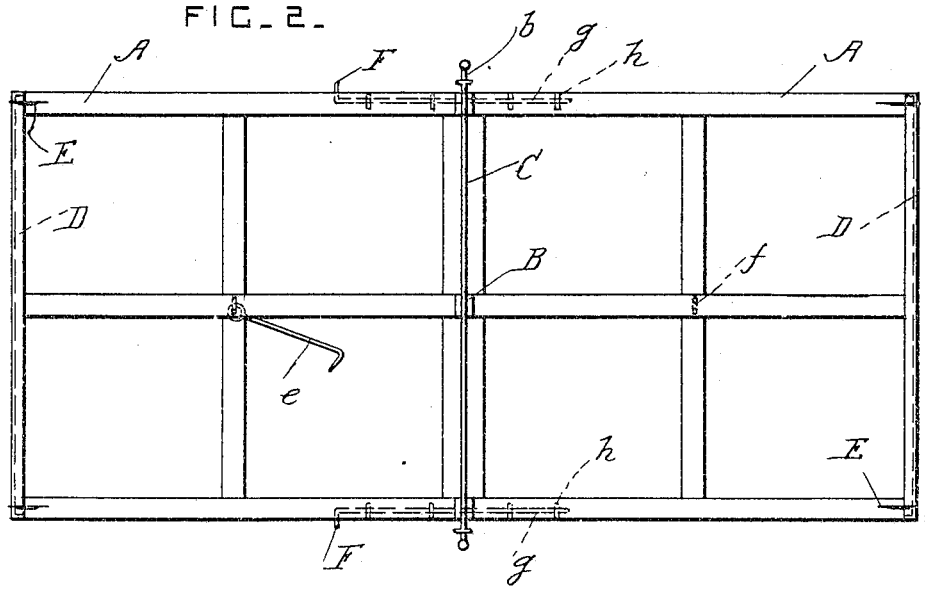
FIG_2_
WITNESSES:
INVENTORS
George Kaphingst
and Paul Seith
BY
Herbert W. Jenner
Attorney No. 787,883. Patented April 18, 1905.

UNITED STATES PATENT OFFICE.

GEORGE KAPHINGST AND PAUL SEITH, OF APPLETON, WISCONSIN, ASSIGNORS OF ONE-THIRD TO D. P. NICHOLSON.

PAPER-HOLDER.

SPECIFICATION forming part of Letters Patent No. 787,883, dated April 18, 1905.

Application filed June 6, 1904. Serial No. 211,325.

*To all whom it may concern:*

Be it known that we, GEORGE KAPHINGST and PAUL SEITH, residing at Appleton, in the county of Outagamie and State of Wisconsin, have invented certain new and useful Improvements in Paper-Holders; and we do hereby declare the following to be a full, clear, and exact description of the invention, such as will enable others skilled in the art to which it appertains to make and use the same.

This invention relates to holders or supports for sticky fly-paper, photographs, copy, music, and other articles; and it consists in the novel construction and combination of the parts hereinafter fully described and claimed.

In the drawings, Figure 1 is a perspective view of the holder, showing it in its raised position. Fig. 2 is a plan view of the holder, showing it spread out flat.

A represents two similar frames which are connected together by a hinge or hinges B. The hinge pivot-pin $b$ has a loop-shaped bail C pivoted on its end portions, and this bail forms a handle for lifting the holder and moving it from place to place and also for suspending it from any convenient support. This bail may be made of wire, or it may be a chain or cord. The opposite ends of the holder from the hinges are provided with shallow troughs D, and these troughs D are adapted to hold liquid and come at the bottom of the holder when in its raised position, as shown in Fig. 1.

E represents springs carried by the bottom end portions of the holder for holding the paper in position.

When the holder is used to support sticky fly-paper, the sticky coating which slides off the paper, the dead flies, and other objects are caught in the troughs D.

A hook $e$ or other equivalent locking device is pivoted to one frame and engages with an eye $f$ on the other frame, so that the two frames can be locked together in their raised position.

F represents locking devices for locking the two frames together when spread out, so that they can be suspended by the bail. Slidable locking-bolts $g$ may be used for this purpose, which are carried by one frame and which engage with eyes $h$ on the other frame; but any other approved locking devices may be used.

What we claim is—

1. The combination, with two pivoted frames provided with catch-troughs for the purpose of catching liquid, of means for locking the said frames together.

2. The combination, with two pivoted frames provided with catch-troughs for the purpose of catching liquid, of retaining-springs connected to the said frames adjacent to the said catch-troughs, and means for locking the said frames together when arranged at an angle to each other.

3. The combination, with two pivoted frames provided with catch-troughs, of locking devices for locking the said frames together when arranged at an angle to each other, and separate locking devices for locking the said frames together when spread out flat.

In testimony whereof we affix our signatures in presence of two witnesses.

GEORGE KAPHINGST.
PAUL SEITH.

Witnesses:
A. H. KRUGMEIER,
CORA STORCH.